Inventor
ALAN TAYLOR &
STANLEY ASHBOURNE
EATON PAYNE
BY *Dean Laurence*
Attorney Feb. 2, 1965   A. TAYLOR ETAL   3,168,049
HELICAL GEAR PUMPS
Filed Sept. 21, 1962   2 Sheets-Sheet 2

*Inventor*
ALAN TAYLOR &
STANLEY ASHBOURNE
EATON PAYNE 3,168,049
HELICAL GEAR PUMPS
Alan Taylor, Lakeview, Johannesburg, Transvaal, and Stanley Ashbourne Eaton Payne, Blairgowrie, Johannesburg, Transvaal, Republic of South Africa, assignors to Mono Pumps Africa (Proprietary) Limited, Lakeview, Johannesburg, Transvaal, Republic of South Africa
Filed Sept. 21, 1962, Ser. No. 225,212
Claims priority, application Great Britain Sept. 26, 1961
7 Claims. (Cl. 103—117)

This invention concerns improvements in helical screw thread pumps. A pump of this type previously made by us comprises a rotor having an external (male) helical thread, and a stator having an internal (female) double start thread, the cross-section of the rotor at any point along its length being circular and the cross-section of the space within the stator at any point along its length being a figure bounded by two semicircles, each of a diameter equal to the diameter of the circle of cross-section of the rotor, and two common tangents to the semicircles. The rotor is mounted rotatably within the stator. The centres of the circles of successive cross-sections of the rotor lie along a helix, the axis of which is the axis of the rotor and the centres of the circles of cross-section of the rotor are eccentric to the axis of the rotor, the eccentricity being the radius of the helix. If the rotor is rotated about its axis whilst meshing within the stator, the axis of the rotor describes a small circle, of radius equal to the eccentricity, in a direction opposite to the rotation of the rotor and the circular cross-section at any point along the length of the rotor moves in a straight line path back and forth across the corresponding section of the stator.

In one form of pump of the type referred to, the stator is fixedly mounted and the rotor is coupled to a rotary driving shaft by a universal joint, whilst in another form, the universal joint is omitted, the rotor being mounted solely for rotation about its axis, and the stator is mounted so as to be movable in a direction orbital to its axis so that the correct relative movement between the rotor and stator is obtained.

It is an object of this invention to provide a pump of this type but having a plural-start threaded rotor and co-operating stator. We have found that the relative dimensions of the parts of the pump are critical.

According to the invention a helical screw thread pump comprises a stator and a rotor mounted to rotate sealingly within the stator having at least four internal helical female threads and the rotor one less helical male thread, the grooves of the female threads being defined by part-circular lobe arcs which may have equal radii varying from zero to a finite value, and the ratio of the diameter (D) of the circle (hereinafter referred to as the "stator scroll circle") through the centres of the lobe arcs in any cross-section through the stator at right angles to the stator axis to the eccentricity (E) of the rotor, (the eccentricity being the distance that the rotor axis is offset from the stator axis), being substantially equal to $$16 \sin \frac{180°n - 540°}{2n(n-1)} \cos \frac{540°}{2n} \sin \frac{360°}{2(n-1)} \over \left(1 - \cos \frac{180°}{n}\right)\left(1 - \cos \frac{180°n - 540°}{(n-1)}\right) - 4 \sin^2 \frac{180°n - 540°}{2n(n-1)} \quad (1)$$

where $n$ is the number of threads of the stator: in order that the rotor should rotate within the stator without jamming and without sealing contact between rotor and stator threads being broken during rotation.

The precise shapes which the stator and rotor must have are also completely determined for any specific value of the radius of the describing arcs of the grooves of the threads of the stator.

The cross-section of the space within the stator at any point along its length is constant in shape, although varying in angular orientation about the stator axis, the cross-section of the space being defined by a figure the periphery of which may comprise lobe arcs having equal radii of a finite value and described from centres (hereinafter called "lobe centres") within the cross-section and equiangularly spaced around the stator scroll circle having its centre on the axis of the stator, and a corresponding number of intermediate part-circular arcs (hereinafter called "blending arcs") joining the lobe arcs, the junctions of the lobe arcs and blending arcs being at positions of common tangents to the arcs, and described from centres outside the cross-section and equiangularly spaced around a circle concentric with the stator scroll circle at positions angularly intermediate the lobe centres. The cross-section of the rotor at any point along its length is constant in shape, although varying in angular orientation about its axis, the cross-section being defined by a figure comprising the appropriate number of identical part-circular rotor lobe arcs, i.e. one less than that of the stator, but of the same radius as the stator lobe arcs, described from rotor lobe centres within the rotor cross-section and equiangularly spaced around a circle (referred to as the "rotor scroll circle") having its centre on the axis of the rotor, and a corresponding number of part-circular rotor blending arcs joining the rotor lobe arcs, the junctions of the rotor lobe arcs and the rotor blending arcs being at positions of common tangents to the arcs, described from centres outside the rotor cross-section and equiangularly spaced around a circle concentric with the rotor scroll circle through the rotor lobe centres at positions angularly intermediate the latter. The rotor scroll circle has a diameter which is equal to the stator scroll circle diameter (D) less twice the eccentricity (E) (i.e. rotor scroll circle diameter=D—2E), and the distance of the describing centres of the blending arcs of the stator from the stator axis being substantially equal to $$\frac{2E(D-2E)}{4E - D\left(1 - \cos \frac{180°}{n}\right)} \quad (2)$$

where $n$ has the same significance as before. The distance of the describing centres of the rotor blending arcs from the rotor axis are substantially equal to $$\frac{2E(D-4E)}{6E - D + (D-2E) \cos \frac{180°}{n-1}} \quad (3)$$

where $n$ again has the same significance as before.

Where the stator and rotor are made of a substantially non-resilient material, e.g. steel or brass, the values of D/E and the distances of the centres of the blending arcs of the stator and rotor from the respective centres of the latter should be given exactly by the expressions in the above statement. Where, however, the stator is formed of a resilient material, e.g. natural or synthetic rubber, it will be appreciated that these values may approximate to those given by these expressions.

The cross-sectional shapes of the stator and rotor of a pump according to this invention for a given number of threads may be determined by specifying the stator scroll diameter or the eccentricity (i.e. D or E) and the radius of the stator (and rotor) lobe arcs. This lobe arc radius may theoretically vary from zero, when the lengths of the stator and rotor lobe arcs are zero and the internal form of the stator and external form of the rotor are defined solely by the blending arcs, to a value equal to the distance between the lobe centre and the adjacent blending arc centre at which the lengths of the blending arcs become zero and the internal form of the stator and external form of the rotor are defined solely by the lobe arcs. In practice, values within the range but away from the extreme limits are preferably used.

Although in the pump according to this invention the stator may be fixed against rotation and the rotor may be rotated by a Cardan shaft or from any rotatable driving shaft via a universal joint, the rotor and stator are both symmetrical about their respective axes and the only eccentric motion is a rotation of the axis of the rotor about the axis of the stator in a direction opposite to the direction of rotation of the rotor about its own axis so that the use of a universal joint may be dispensed with, the rotor being mounted solely for rotation about its axis, and the stator allowed to rotate freely about its axis so that there are no out-of-balance forces. The stator will in this case be driven by the rotor but will rotate at a speed slower in the ratio $$\frac{n-1}{n}$$

In order that this invention may more readily be understood, reference will now be made by way of example to the accompanying drawings in which.

Figure 1:
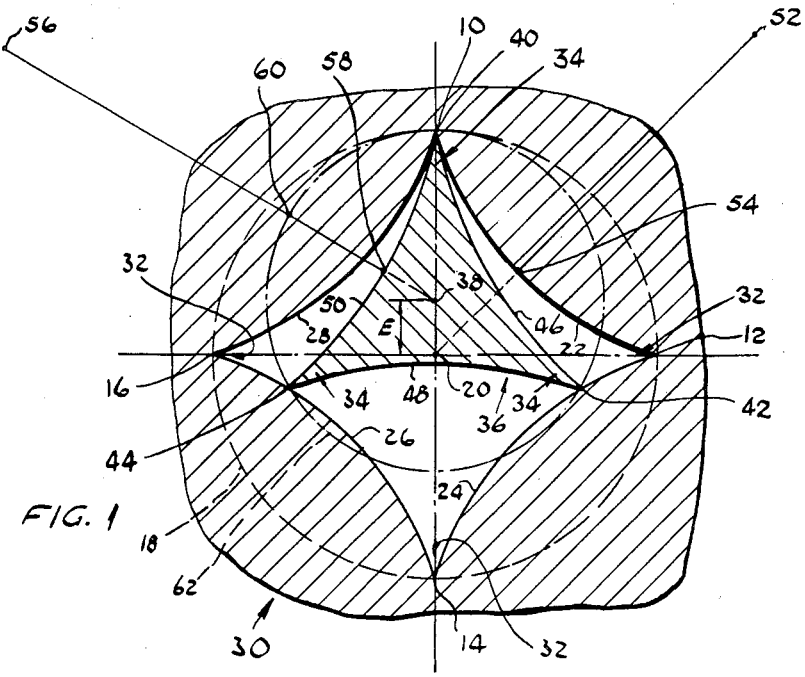
FIGURE 1 illustrates diagrammatically a cross-section through a pump according to this invention and comprising a stator having four threads and a rotor having three threads, this pump being the theoretically basic form in which the radius of the lobe arc is zero and the internal form of the stator and external form of the rotor are defined solely by the blending arcs.

Referring to FIGURE 1, the references 10, 12, 14 and 16 represent the centres of the stator lobe arcs which in this basic form have a radius equal to zero. These centres lie at equiangularly spaced positions around a circle 18 which we term the "stator scroll circle," the centre 20 of which is on the axis of the stator and the diameter of which is D. The stator lobe arcs, in this case the points 10, 12, 14 and 16, are joined as shown by part-circular blending arcs 22, 24, 26 and 28.

The stator 30 has female screw thread grooves 32 with which male screw threads 34 of rotor 36 cooperate. The rotor is mounted to rotate about its axis sealingly within the stator, and its axis is offset from the axis of the stator by a distance E, the eccentricity of the pump. Thus, the centre 38 of the cross-section of the rotor is spaced from the centre 20 by the distance E. The centres of the rotor lobe arcs, which like the stator lobe arcs have a zero radius, are represented by the points 40, 42, and 44 and are joined by part-circular rotor blending arcs 46, 48 and 50.

As previously mentioned the ratio D/E is given by Expression 1. When $n=4$, this expression becomes $$\frac{D}{E} = \frac{16 \sin \frac{15°}{2} \cos \frac{135°}{2} \sin 60°}{(1-\cos 45°)(1-\cos 60°) - 4 \sin^2 \frac{15°}{2}} \quad (4)$$

The distance of the describing centres of the stator blending arcs 22, 24, 26 and 28 from the centre 20 must be equal, or substantially equal, to the value given by Expression 2. When $n=4$, this expression becomes $$\frac{2E(D-2E)}{4E-D(1-\cos 45°)} \quad (5)$$

In FIGURE 1, the describing centre of the stator blending arc 22 is indicated at 52 so that the distance between centre 52 and centre 20 is equal, or substantially equal, to the value given by Expression 5. The distance between the stator scroll circle centre 20 and the point, indicated at 54, where the line between centre 20 and centre 52 intersects the blending arc 22 is $$\frac{D}{2} - 2E$$

The distance of the describing centres of the rotor blending arcs 46, 48 and 50 from the centre 38 must be equal, or substantially equal, to the value given by Expression 3. When $n=4$, this expression becomes $$\frac{2E(D-4E)}{6E-D+(D-2E)\cos 60°} \quad (6)$$

In FIGURE 1, the describing centre of the rotor blending arc 50 is indicated at 56 so that the distance between centre 56 and centre 38 is equal, or substantially equal, to the value given by Expression 6. The distance between the point, indicated at 58, where the line between centre 38 and centre 56 intersects the blending arc 50 and the point, indicated at 60, where such line intersects the rotor scroll circle 62 through points 40, 42 and 44 on centre 38, is 2E.

Figure 2:
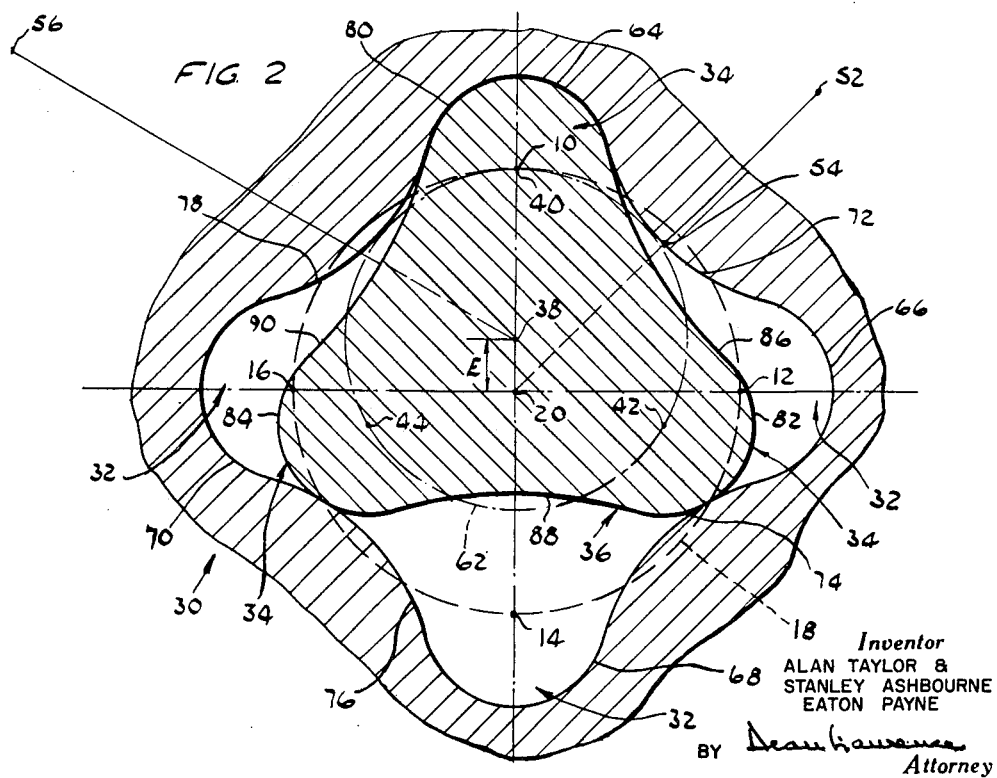
FIGURE 2 illustrates diagrammatically a cross-section through a pump of the form of FIGURE 1 and having the same scroll diameter and eccentricity, but having a finite lobe arc radius.

FIGURE 2 illustrates a cross-section of a pump of the same form as that shown in FIGURE 1 and having an identical scroll circle, but in which the stator and rotor lobe arcs have a finite radius. The points on FIGURE 2 corresponding with those of FIGURE 1 are indicated by the same reference numerals. It will be seen that the stator has four identical part-circular lobe arcs 64, 66, 68 and 70 described about the centres 10, 12, 14 and 16 on the stator scroll circle 18 and four part-circular blending arcs 72, 74, 76 and 78 described from the same centres as the arcs 22, 24, 26 and 28 of FIGURE 1. Thus arc 72 is described from the centre 52 a distance from centre 20 equal, or substantially equal, to the value given by Expression 5. The junctions of the blending arcs 72, 74, 76 and 78 and lobe arcs 64, 66, 68 and 70 are at the points where the adjoining arcs have common tangents.

Similarly (still referring to FIGURE 2), the rotor 36 has three identical part-circular lobe arcs 80, 82 and 84 of the same radius as the stator lobe arcs and described about the centres 40, 42 and 44 and three part-circular blending arcs 86, 88 and 90 described from the same centres as the arcs 46, 48 and 50 of FIGURE 1. Thus arc 90 is described from the centre 56 a distance from centre 38 equal, or substantially equal, to the value given by Expression 6. The junctions of the blending arcs 86, 88 and 90 with the lobe arcs 80, 82 and 84 are at the points where the adjoining arcs have common tangents.

It will be appreciated that a variety of pumps of the form of FIGURES 1 and 2 can be made having the same stator scroll circle by varying the lobe arc radius. In each case the blending arcs will be described from the same centres. The limiting value for the lobe arc radius is given by the distance between the centre 10 and the centre 52 because then the blending arc radius becomes zero and the stator form is described solely by the lobe arcs. Similarly, a variety of similar pumps can be made by varying the diameter of the scroll circle 18.

Figure 3:
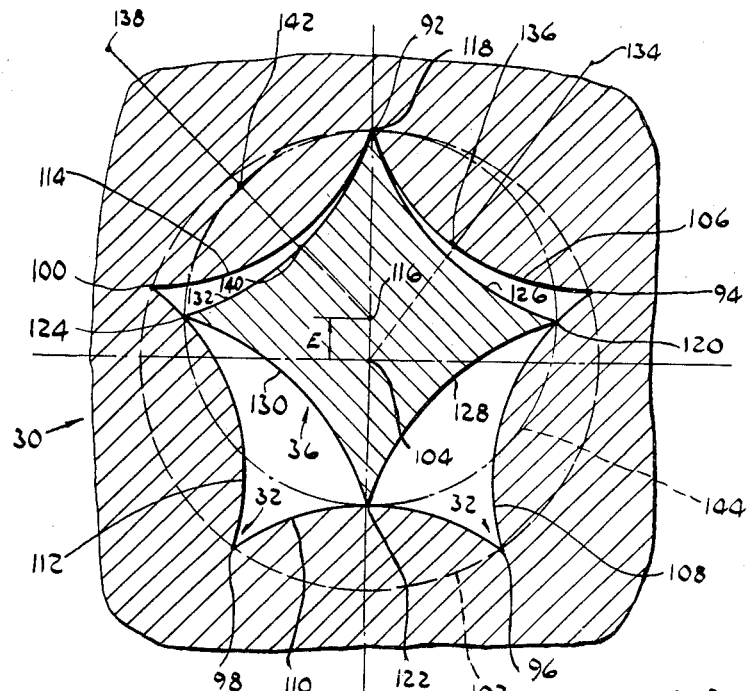
FIGURE 3 illustrates diagrammatically a cross-section through a pump according to this invention of the theoretically basic form comprising a stator having five threads and a rotor having four threads.

A further variation may be made by varying $n$ the number of threads of the stator. FIGURE 3 shows the theoretically basic form of a pump according to this invention in which the stator 30 has five threads and the rotor 36 has four threads.

Referring to this figure, the references 92, 94, 96, 98 and 100 represent the five centres of the stator lobe arcs which in this basic form have zero radius. These centres lie at equiangularly spaced positions around the scroll circle 102, the centre of which is indicated by the reference 104 and the diameter of which is D. The points 92, 94, 96, 98 and 100 are joined by part circular blending arcs 106, 108, 110, 112 and 114.

The rotor 36 located within the stator 30 has its axis offset from the axis of the stator, i.e. the centre 116 of the rotor cross-section illustrated, is a distance E from the centre 104. References 118, 120, 122, and 124 represent the four centres of the rotor lobe arcs which in this basic form have zero radius. These centres lie at equiangular positions around the centre 116 and are joined by part-circular blending arcs 126, 128, 130 and 132.

When $n=5$, Expression 1 becomes $$\frac{D}{E}=\frac{16 \sin 9° \cos 54° \sin 45°}{1-\cos 36°-4 \sin^2 9°} \quad (7)$$

Again, the distance of the describing centres of the stator blending arcs 106, 108, 110, 112 and 114 from the centre 104 must be equal, or substantially equal, to the value given by Expression 2. When $n=5$, this expression becomes $$\frac{2E(D-2E)}{4E-D(1-\cos 36°)} \quad (8)$$

In FIGURE 3, the describing centre of the stator blending arc 106 is indicated at 134 so that the distance between centre 134 and centre 104 is given by Expression 8. As before, the distance from the scroll circle centre, in this case 104, to the point of intersection, indicated by the reference 136, of the line between centres 134 and 104 with the blending arc 106 is $$\frac{D}{2}-2E$$

The distance of the describing centres of the rotor blending arcs 126, 128, 130 and 132 from the centre 116 must be equal, or substantially equal, to the value given by Expression 3. When $n=5$, this expression becomes $$\frac{2E(D-4E)}{6E-D+(D-2E) \cos 45°} \quad (9)$$

In FIGURE 3, the describing centre of the rotor blending arc 132 is indicated at 138 so that the distance between centre 138 and centre 116 is given by Expression 9. As before, the distance between the point, indicated at 140, where the line between centre 116 and centre 138 intersects the blending arc 132 and the point, indicated at 142, where such line intersects the rotor scroll circle 144 through points 118, 120, 122 and 124 on centre 116 is 2E. That is the distance between points 140 and 142 is 2E.

As in the case of the form of pump shown in FIGURES 1 and 2 an infinite variety of pumps of the form of FIGURE 3 may be produced by varying the stator and rotor lobe arc radius from zero as shown in FIGURE 3 to the maximum value which equals the distance between point 92 and point 134, the blending arcs in each case being described from the same centres as the blending arcs 106 to 114, and 126 to 132 of FIGURE 3. Further variation may be produced by varying the diameter of the stator scroll circle 102.

As previously stated, pumps in which the lobe arc radius differ from the extremes of its possible values are preferred. FIGURE 2 shows cross-sectional shapes of a suitable intermediate form of pump having a stator provided with four threads and a rotor provided with three threads. A form suitable for many uses, may be that in which the stator blending arcs are tangential to the stator scroll circle, (18) and in which the rotor blending arcs are tangential to the rotor scroll circle 62 through the rotor lobe arc centres 40, 42, and 44, that is, when the stator and rotor lobe arc radii equal 2E.

It will be appreciated from the foregoing description how pumps having stators provided with six or more threads may be constructed on the same principle as that illustrated in connection with stators having four and five threads. Although a pump can be made in accordance with this invention with a stator having a number of threads greater than four, it seems that particularly useful forms of pump will have stators having five, six or seven threads.

Figure 4:
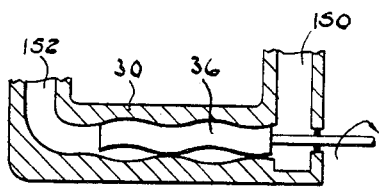
FIGURE 4 shows diagrammatically a longitudinal section of a pump of this type.

Referring to FIGURE 4, there is shown diagrammatically a helical screw type pump having an internally helically screw threaded stator 30, and an externally threaded rotor 36 within the stator. The direction of flow of fluid through the pump axially, will depend upon the direction of rotation of the pump, whether openings 150 and 152 are to be inlet and outlet openings, or vice versa. The rotor 36 has a driving shaft 37 whereby rotary power may be applied to the rotor.

Figure 5:
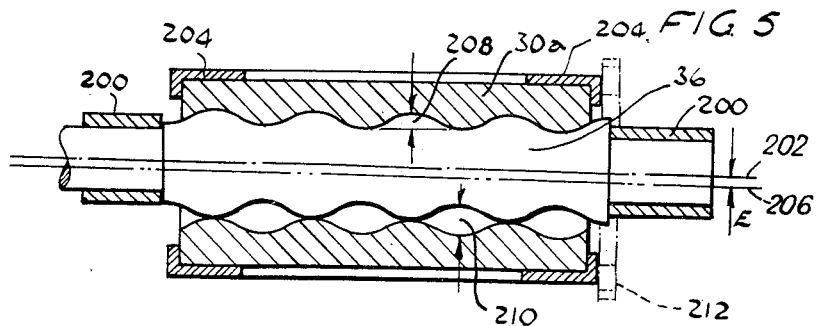
FIGURE 5 shows diagrammatically a longitudinal section of a pump with rotatably mounted stator.

Referring to FIGURE 5, there are shown a rotor 36 mounted to rotate in fixed bearings 200 about its axis 202, and within stator 30a mounted to rotate on fixed bearings 204, about its axis 206, which is eccentric to the rotor axis by an amount E. The dimension 208 is equal to twice the eccentricity E, i.e., is equal to 2E; and the dimension 210 is equal to four times the eccentricity E i.e. is equal to 4E. If desired, the stator may be driven by means of ring gear 212, or by any suitable means.

In operation, when the stator threads are four in number and the rotor threads are three in number, then if the rotor speed is 1000 r.p.m. the stator speed will be 750 r.p.m. and the relative speed between stator and rotor will be 250 r.p.m.

It is possible, therefore, to have a non-rotating stator and rotating driven rotor a non-rotating rotor but driven and rotating stator and an arrangement where both rotor and stator are driven to rotate about their axes.

The direction of pumping may be reversed for a particular direction of rotation by providing stator and rotor assemblies of opposite hand.

Although the term "pump" has been used throughout this specification for describing the apparatus according to this invention, it will be understood that different embodiments of the apparatus may serve not only as pumps, but also as compressors, rotary engines, fluid motors, or transmission devices. Accordingly, the term "pump" is to be understood to include all these embodiments and is to be interpreted widely. The intention is to ensure that the monopoly is not avoided by someone using the principle of the invention in an embodiment which is not a pump in the convention sense.

We claim:

1. Helical screw thread apparatus comprising a stator, and a rotor mounted to rotate sealingly within the stator, the rotor longitudinal axis being off-set a distance E from the stator longitudinal axis; a number $n$ which is at least four, of internal female helical threads in the stator entirely formed by part circular stator lobe arcs and by part circular stator blending arcs joining the stator lobe arcs at positions of common tangents to these arcs, the stator lobe arc centers being on a stator scroll circle whose center is on the longitudinal axis of the stator, the diameter of the stator scroll circle being of a value D; and a number $n-1$ external male helical threads on the rotor entirely formed by part circular rotor lobe arcs having the same radius of curvature as the stator lobe arcs and by part-circular rotor blending arcs joining the rotor lobe arcs at positions of common tangents to these arcs, the rotor lobe arc centers being on a rotor scroll circle having its center on the rotor axis, the rotor scroll circle being tangential to the stator scroll circle; the ratio of D to E being substantially equal to $$\frac{16 \sin \frac{180°n-540°}{2n(n-1)} \cos \frac{540°}{2n} \sin \frac{360°}{2(n-1)}}{\left(1-\cos\frac{180°}{n}\right)\left(1-\cos\frac{180°n-540°}{(n-1)}\right)-4\sin^2\frac{180°n-540°}{2n(n-1)}}$$

the cross-section of the space within the stator at longitudinally spaced points along its length being constant in shape, although varying in angular orientation about the stator axis, and being defined by a figure the periphery of which consists of the stator lobe arcs described from stator lobe centers within the cross-section and equiangularly spaced around the stator scroll circle, and a corresponding number of the part circular stator blending arcs joining the stator lobe arcs and described from centers outside the cross-section and equiangularly spaced around a circle concentric with the stator scroll circle at positions angularly intermediate the stator lobe centers; the cross-section of the rotor at longitudinally spaced points along its length being constant in shape although varying in angular orientation about the rotor axis, and being defined by a figure the periphery of which consists of $n-1$ part circular rotor lobe arcs, and described from rotor lobe centers within the rotor cross-section and equiangularly spaced around the rotor scroll circle, and a corresponding number of the part circular rotor blending arcs joining the rotor lobe arcs described from centers outside the rotor cross-section and equiangularly spaced around a circle concentric with the rotor scroll circle at positions angularly intermediate the latter; the rotor scroll circle having a diameter which is substantially equal to the stator scroll circle diameter D less twice the eccentricity E, the distance of the describing centers of the stator blending arcs from the stator axis being substantially equal to $$\frac{2E(D-2E)}{4E-D\left(1-\cos\frac{180°}{n}\right)}$$

and the distance of the describing centers of the rotor blending arcs from the rotor axis being substantially equal to $$\frac{2E(D-4E)}{6E-D+(D-2E)\cos\frac{180°}{n-1}}$$

2. Helical screw thread apparatus comprising a stator, and a rotor mounted to rotate sealingly within the stator, the rotor longitudinal axis being off-set a distance E from the stator longitudinal axis; a number $n$ which is a least four, of internal female helical threads in the stator entirely formed by part circular stator lobe arcs and by part circular stator blending arcs joining the stator lobe arcs at positions of common tangents to these arcs, the distance of the describing centers of the stator blending arcs from the stator axis being substantially equal to $$\frac{2E(D-2E)}{4E-D\left(1-\cos\frac{180°}{n}\right)}$$

the stator lobe arc centers being on a stator scroll circle whose center is on the longitudinal axis of the stator, the diameter of the stator scroll circle being of a value D; and a number $n-1$ external male helical threads on the rotor entirely formed by part circular rotor lobe arcs having the same radius of curvature as the stator lobe arcs and by part-circular rotor blending arcs joining the rotor lobe arcs at positions of common tangents to these arcs, the distance of the describing centers of the rotor blending arcs from the rotor axis being substantially equal to $$\frac{2E(D-4E)}{6E-D+(D-2E)\cos\frac{180°}{n-1}}$$

the rotor lobe arc centers being on a rotor scroll circle having its center on the rotor axis, the rotor scroll circle being tangential to the stator scroll circle; the ratio of D to E being substantially equal to $$\frac{16 \sin \frac{180°n-540°}{2n(n-1)} \cos \frac{540°}{2n} \sin \frac{360°}{2(n-1)}}{\left(1-\cos\frac{180°}{n}\right)\left(1-\cos\frac{180°n-540°}{(n-1)}\right)-4\sin^2\frac{180°n-540°}{2n(-1)}}$$

thereby permitting free rotation of the rotor about its axis and around the stator axis within the stator while maintaining sealing contact between the stator and rotor threads.

3. Apparatus according to claim 2 in which the radii of the stator and rotor lobe arcs are each substantially equal to 2E.

4. Apparatus according to claim 2 in which either of the stator and rotor is made from resilient material such as rubber.

5. Apparatus according to claim 2 in which the number of stator threads lie within the range 4 to 8 inclusive.

6. Apparatus according to claim 2 in which the stator is mounted to rotate about its axis.

7. Apparatus according to claim 6 in which the stator has drive means for driving connections to a rotary power input source.

References Cited in the file of this patent

UNITED STATES PATENTS

| Re. 21,374 | Moineau | Feb. 27, 1940 |
| 1,892,217 | Moineau | Dec. 27, 1932 |
| 2,028,407 | Moineau | Jan. 21, 1936 |
| 2,965,039 | Morita | Dec. 20, 1960 |

FOREIGN PATENTS

| 547,826 | Germany | Apr. 7, 1932 |
| 316,295 | Great Britain | May 15, 1930 |
| 427,475 | Great Britain | Apr. 15, 1935 |
| 596,379 | Great Britain | Jan. 2, 1948 |
| 871,822 | Great Britain | July 5, 1961 |

OTHER REFERENCES

Kinematics of Gerotors, Book by M. F. Hill, 1927, copy in 103–126A (44 pgs.)

Kinematics of Gerotors, Rotoids and Gears, Book by M. F. Hill, 1947, copy in 103–126A (28 pgs.)

UNITED STATES PATENT OFFICE
CERTIFICATE OF CORRECTION

Patent No. 3,168,049 February 2, 1965

Alan Taylor et al.

It is hereby certified that error appears in the above numbered patent requiring correction and that the said Letters Patent should read as corrected below.

Column 8, lines 19 to 23, for that portion of the expression reading:

$$\frac{180°n-540°}{2n(-1)} \quad \text{read} \quad \frac{180°n-540°}{2n(n-1)}$$

Signed and sealed this 27th day of July 1965.

(SEAL)
Attest:

ERNEST W. SWIDER
Attesting Officer

EDWARD J. BRENNER
Commissioner of Patents